Dec. 26, 1950 J. C. WEAVER 2,535,975
STORAGE BATTERY CRADLE
Filed Oct. 8, 1948 2 Sheets-Sheet 1
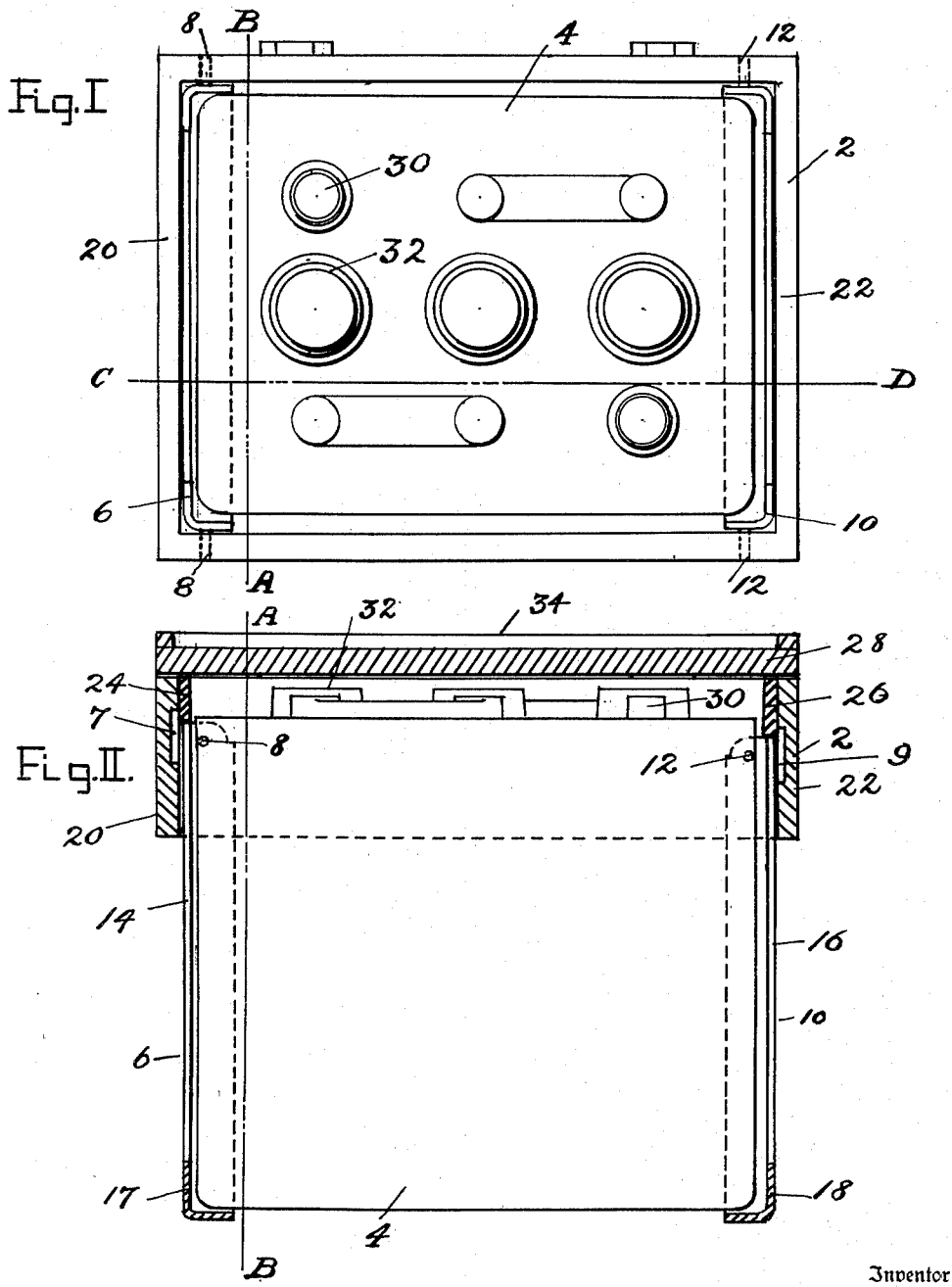
Inventor
James C. Weaver.
By Arthur Scrivener
Attorney

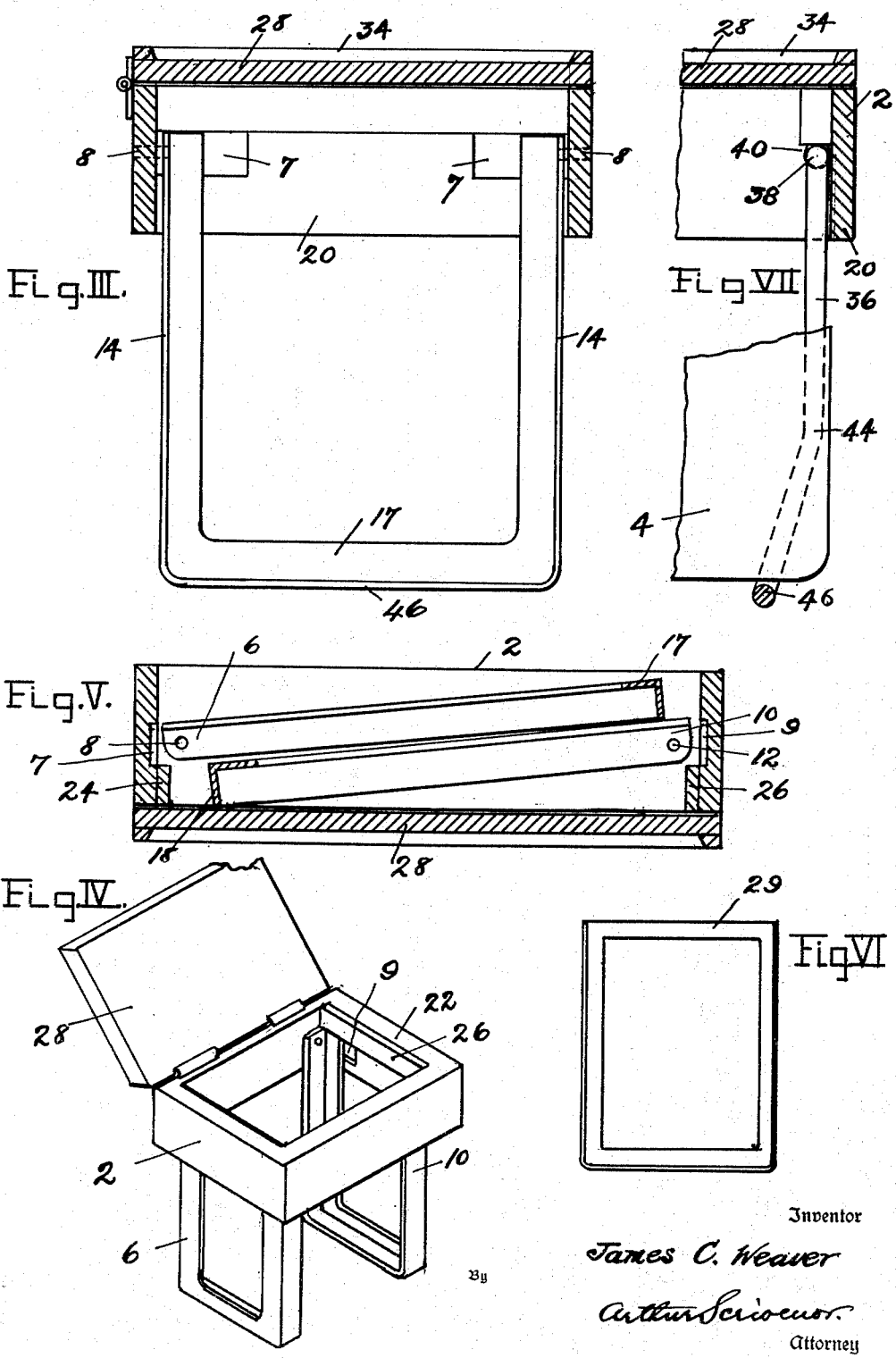

Patented Dec. 26, 1950

2,535,975

UNITED STATES PATENT OFFICE 2,535,975

STORAGE BATTERY CRADLE

James C. Weaver, Richmond, Va.

Application October 8, 1948, Serial No. 53,500

3 Claims. (Cl. 217—47)

My invention relates to the transporting and to protection during transporting of heavy and fragile articles having a regular shape, either straight lined or curved; and particularly to the protection while transporting and also while in storage of electric storage batteries, especially those of the type used in automobiles, in which the plates are suspended in spaced relation in a plastic shell, and are covered with a plastic layer in which are embedded the terminal posts, the capped orifices for water, and the straps connecting the individual cells. It is very important that during shipment and also during storage no weight shall be placed upon the tops of such batteries, and that there shall be no chance of a short circuit between the battery cells.

The object of my invention is to provide a cradle for carrying such a battery, which shall be strong, and take up little space; which shall be capable of supporting the weight of three or more superimposed batteries in their cradles; which will stand rough handling; which may be quickly put into service; and which shall be made up of few and simple parts. I term my device a cradle; and forming a part of it are stirrups which carry the battery.

In the drawings, which form a part of this specification:

Figure I shows in plan the body of the cradle, with cover removed, and with a battery in place.

Figure II is a vertical longitudinal section of the cradle on line CD in Figure I, with a battery shown in outline.

Figure III is a vertical cross section of the cradle with cover removed, and showing a stirrup in front elevation.

Figure IV is a general view of the cradle in isometric perspective, with the cover (partly broken) raised to admit a battery.

Figure V is a longitudinal section of the cradle, inverted, with cover closed, and with the stirrups folded in and secured.

Figure VI is an alternate design of a stirrup, in front elevation.

Figure VII shows another design of stirrup, in vertical section.

My invention will now be described as designed for use in the transporting of storage batteries.

In Figure I the numeral 2 indicates a frame, of wood or of metal or of strong plastic, rectangular in shape; and in plan having a little larger inside dimensions than the outside dimensions of the battery 4 to be placed within it.

At the ends of the frame and inside it, and opposing each other, are two stirrups 6 and 10, pivoted respectively at 8 and 12 on the inner surface of the frame 2. See Figs. I and II. These two stirrups are pivoted at slightly different heights in the frame 2, see Figs. II and V, for a reason that will be explained later. The stirrups are preferably formed of angles of small section, and of suitable material such as steel or of an alloy of aluminum; and consist of the legs 14, of stirrup 6, and the legs 16 of stirrup 10. In each case the legs are connected by the cross angles 17 and 18, respectively, which form a bearing surface for the battery. Though the stirrups are preferably made up of angle sections, they may be made of other sections, such as bars or rods; in any case being provided with the horizontally disposed bearing surfaces, known in the harness trade as the "treads" of the stirrups, to carry the battery.

Referring to Figures II, III and IV, and V: at each end of the frame 2, and on the inside of each of the end pieces 20 and 22 of frame 2, are securely fixed pieces or strips 24 and 26; strip 24 being above stirrup 6 and strip 26 above stirrup 10. These strips may be of hard wood or of metal. It will be seen, in Figure I, that strip 24 is immediately above and in practical contact with the top of the legs 14 of stirrup 6; and that the strip 26 is immediately above and in practical contact with the tops of the legs 16 of stirrup 10. So: any weight placed upon the top of the frame 2, or on the cover 28 when it is closed upon the frame 2, will be transmitted through the strips 24 and 26, respectively, to the tops of the legs 14 and 16, and through them to the ground surface below. No part of the weight of a cradle, or of any weight placed upon the cradle, will fall upon the battery carried in the cradle. This is very important, because a storage battery is not built up of rigid material adapted to carry weight. In cradles designed for large and heavy batteries I connect the upper ends of the legs 14 and 16, respectively of the stirrups 6 and 10, by means of cross-bars 29 (Fig. VI); placing these cross-bars at such a height that the lower edges of strips 24 and 26 will bear upon them as well as upon the ends of the legs 14 and 16; increasing the bearing surface to carry the greater weight. It will also be seen that the top of the battery 4 and its terminal posts 30 and filling caps 32 are some distance below and clear of the cover 28. This clearance is governed by the length given to the legs 14 and 16 of the stirrups 6 and 10. The battery 4 rests upon the stirrup cross pieces 17 and 18.

The stirrup legs 14 and 16 are so pivoted that the upper ends of the stirrups, when they are unfolded and set to carry a battery, rest against the end pieces 20 and 22 of the frame 2; so preventing the farther spreading apart of the treads 17 and 18 of the two stirrups 6 and 10. Though it is most unlikely that the treads 17 and 18 could be forced farther apart, unless the frame or the stirrup is fractured or distorted in some way, prevention against such accident may be provided by means of a loop of twine placed around the opposite treads and tied at the ends after the battery is in place. Such a loop would be a preventer against accident, and not a part of my device. Other forms of tie can be devised; but they are not necessary if the cradle is properly constructed; and they would be a breakable part to care for.

The stirrup has been heretofore described as made of an angle section; such section being stiff and strong in proportion to weight. The stirrup may also be made of flat bar, or of rod, square or round. In the case of a round rod I bend the ends of the stirrups in the form of hooks to form the pivots; and I bend the side pieces of the stirrups to bring the treads well under the battery case. This form of stirrup is shown in Figure VII, wherein 20 indicates one end of the frame 2; and 36 is the stirrup, bent at its upper ends 38 to form hooks which form the pivots entering holes 40 in the side pieces 42 of frame 2. I bend the stirrup at 44 to bring the tread 46 well under the battery case 4.

I have said hereinbefore that the two stirrups 6 and 10 are pivoted at slightly different heights in frame 2. This is the case only with batteries of certain proportions of length to depth; and where the depth of the battery is about equal to or greater than its length. Referring to Figure II, which shows the cradle in an upright position; and also referring to Figure V, in which the cradle is inverted, with the stirrups folded within it: In Figure II the stirrups are extended to receive the battery. If the distance or length of a stirrup from pivot to bottom of tread is greater than the distance from the said pivot to the opposite stirrup, when the first stirrup is folded into the frame 2, it will strike against the other and standing stirrup. To correct this in a simple way: the stirrup first folded down must be shorter than the other stirrup; and since the treads of the stirrups must be at the same level when the stirrups are extended to receive a battery, it follows that the shorter stirrup pivot must be placed farther from the top of the frame 2 than the longer stirrup pivot. This is clear in Figure V, wherein stirrup 10 is folded down first. Stirrup 10 is shorter than stirrup 6; and pivot 12 is higher (in Figure V) than pivot 8. This difference in the length of the stirrups is not necessary when the length of the stirrups is less than the distance of either pivot to the standing stirrup at the other end of the frame; as is the case in many sizes of battery. In designing a cradle for one of these batteries: the stirrups would be made of the same length from pivot to tread; and the pivots would be set at the same level. In an extreme case: where the depth of a battery is so great in proportion to its length that the stirrups cannot be nested in the frame while still mounted on their pivots, I remove the stirrups by springing the pivots from their bearings. In such a case I use a stirrup of flat or rod form, which, after being sprung to remove a pivot from a socket, will return to its original shape.

The lid 28, which is shown broken at one corner in Figure IV to clear the adjacent Figure V, is hinged to the top of the frame 2 in any strong and suitable manner; and it may be secured when closed upon frame 2 by any suitable form of catch. Upon the top of the lid and along its edges is a bead 34; the purpose of which is to prevent a superimposed battery from sliding off the lid.

In Figures II, III, IV, and V the numerals 7 and 9 indicate recesses cut in the end pieces 20 and 22 to allow clearance for the ends of stirrups 6 and 10 when they are turned on pivots 8 and 12, respectively. When the cross-bar 29 is used at the head of the stirrup, the recesses 7 and 9 are cut the full length of the end pieces 20 and 22.

I claim:

1. In a foldable device for shipping storage batteries, in combination: a rectangular frame comprising sides and ends of substantial depth; a removable cover on the frame; and stirrups arranged crosswise of the frame and within the frame and adjacent each end of the frame; the said stirrups being pivoted to swing to positions within the frame and also to swing to positions opposing one another and substantially at right angles to the plane of the frame, and when so swung being adapted to support a storage battery.

2. In a foldable device for shipping storage batteries, in combination: a rectangular frame comprising sides and ends of substantial depth; a removable cover on the frame; and stirrups arranged crosswise of the frame and within the frame and adjacent each end of the frame; the said stirrups being pivoted to swing to positions within the frame and also to swing to positions opposing one another and substantially at right angles to the plane of the frame and against the end pieces of the frame; and when so swung being adapted to support a battery.

3. In a foldable device for shipping storage batteries, in combination: a rectangular frame having sides and ends of substantial depth; a removable cover on the frame; stirrups arranged crosswise of the frame and within the frame and adjacent each end of the frame, the said stirrups being pivoted to swing to positions within the frame and also to swing to positions opposing one another and substantially at right angles to the plane of the frame and against the end pieces of the frame; and on the inner surfaces of the frame projecting ledges arranged above the pivoted ends of the stirrups and adapted when the stirrups are swung out from the frame to transmit the weight of the frame and of superimposed objects to the legs of the stirrups.

JAMES C. WEAVER.

REFERENCES CITED

The following references are of record in the file of this patent:

UNITED STATES PATENTS

| Number | Name | Date |
| --- | --- | --- |
| 2,022,595 | Gowing | Nov. 26, 1935 |
| 2,414,708 | Passichis | Jan. 21, 1947 |